c

(12) United States Patent
Shinbo et al.

(10) Patent No.: US 7,948,679 B2
(45) Date of Patent: May 24, 2011

(54) SCREEN AND PROJECTOR

(75) Inventors: Akira Shinbo, Shiojiri (JP); Ryoji Katsuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 12/401,150

(22) Filed: Mar. 10, 2009

(65) Prior Publication Data

US 2009/0231696 A1    Sep. 17, 2009

(30) Foreign Application Priority Data

Mar. 17, 2008    (JP) .................................. 2008-067207

(51) Int. Cl.
*G03B 21/60* (2006.01)
(52) U.S. Cl. ........................................ 359/455; 359/459
(58) Field of Classification Search .................. 359/459, 359/449, 454–455
See application file for complete search history.

(56) References Cited

U.S. PATENT DOCUMENTS

| | | | | |
|---|---|---|---|---|
| 7,499,214 | B2 * | 3/2009 | Novet et al. ..................... | 359/459 |
| 7,532,396 | B2 * | 5/2009 | Yonekubo et al. ............ | 359/459 |
| 7,542,205 | B2 * | 6/2009 | Poulsen ........................ | 359/452 |
| 7,570,423 | B2 * | 8/2009 | Willard .......................... | 359/459 |
| 2009/0059365 | A1 * | 3/2009 | Rickers et al. ................ | 359/459 |

FOREIGN PATENT DOCUMENTS

JP    A-2006-215162    8/2006

\* cited by examiner

*Primary Examiner* — Christopher Mahoney
(74) *Attorney, Agent, or Firm* — Oliff & Berridge, PLC

(57) ABSTRACT

A screen includes a plurality of structures arrayed in parallel in at least one direction of a first direction and a second direction perpendicular to the first direction on a reference surface parallel to the first direction and the second direction. The structures are arrayed such that at least one of a distance between central positions of the structures adjacent to each other and a size of the structure changes irregularly in at least one direction, in which the structures are arrayed in parallel, of the first and second directions.

12 Claims, 10 Drawing Sheets

SCREEN AND PROJECTOR

CROSS-REFERENCE TO RELATED APPLICATIONS

This application claims the benefit of JP 2008-067207 filed in Japan on Mar. 17, 2008, the entire disclosure of which is hereby incorporated by reference in its entirety.

BACKGROUND

1. Technical Field

The present invention relates to a screen and a projector and in particular, to a technique of a screen that reflects light corresponding to an image signal.

2. Related Art

A so-called reflective screen that reflects light corresponding to an image signal is requested to have a high reflectance in order to obtain a bright image. In addition, the reflective screen is requested to have a good viewing angle characteristic allowing light distributed at suitable angles to propagate in a direction toward a viewer. A known technique for obtaining a high reflectance and a good viewing angle characteristic in a screen is proposed in JP-A-2006-215162, for example. In the technique proposed in JP-A-2006-215162, the high reflectance and the good viewing angle characteristic are obtained by providing a reflective portion in a portion of a plurality of fine structures arrayed regularly on which light corresponding to an image signal is incident.

When displaying an image using light corresponding to an image signal, a moire may be generated due to diffraction of light caused by periodic patterns. The moire causes deterioration of the image quality by making a color or a pattern, which is not present in an original image signal, appear. The moire is noticeably generated when structures formed on a screen are fine and the structures are regularly arrayed. In addition, the moire becomes conspicuous as the reflectance of the screen increases. Thus, according to the known technique, a problem in that it is difficult to obtain a bright and high-quality image occurs.

SUMMARY

An advantage of some aspects of the invention is that it provides a screen and a projector capable of obtaining a bright image by a high reflectance and a good viewing angle characteristic and displaying a high-quality image by reducing generation of a moire.

According to an aspect of the invention, there is provided a screen including a plurality of structures arrayed in parallel in at least one direction of a first direction and a second direction perpendicular to the first direction on a reference surface parallel to the first direction and the second direction. The structures are arrayed such that at least one of a distance between central positions of the structures adjacent to each other and a size of the structure changes irregularly in at least one direction, in which the structures are arrayed in parallel, of the first and second directions.

The size of the structure is assumed to refer to a magnification ratio of the shape of each structure to the shape as a reference. Diffraction of light caused by periodicity is reduced by irregularly changing at least one of the distance between the central positions of the structures and the size of the structure. By using the plurality of structures arrayed to have irregularity, it becomes possible to reduce generation of a moire while realizing a high reflectance. Accordingly, it is possible to obtain a screen in which a bright image can be obtained by the high reflectance and the good viewing angle characteristic and a high-quality image can be displayed by reducing the generation of a moire. In the screen according to the aspect of the invention, the generation of a moire caused by superposition of a plurality of periodic patterns can be reduced, and generation of an interference fringe caused by diffraction at the structures provided in the screen can also be reduced.

Furthermore, in the screen according to the aspect of the invention, it is preferable that the structures be arrayed such that at least one of the distance between the central positions and the size changes irregularly in the first and second directions. By arraying the plurality of structures having irregularity in the first and second directions, the generation of a moire can be reduced more effectively.

Furthermore, in the screen according to the aspect of the invention, it is preferable that the structures be arrayed such that an upper limit of a distance between a predetermined reference position and the central position is 5% or more and less than 50% of a predetermined reference length in at least one direction of the first and second directions. The reference position is assumed to refer to the central position of the structure when arraying each structure with the distance as a reference length. By changing the distance between the central positions of the structures in such a range, the generation of a moire can be reduced effectively and a high reflectance and a good viewing angle characteristic can be obtained.

Furthermore, in the screen according to the aspect of the invention, it is preferable that upper and lower limits of a width of the structure in at least one direction of the first and second directions be lengths changed from a reference width by a length equivalent to 5% or more and less than 50% of the predetermined reference width. By changing the size of the structure in such a range, the generation of a moire can be reduced effectively and a high reflectance and a good viewing angle characteristic can be obtained.

Furthermore, in the screen according to the aspect of the invention, it is preferable to further include a reflective portion that is formed on a surface of the structure and reflects light. In this case, a high reflectance can be realized.

Furthermore, in the screen according to the aspect of the invention, it is preferable to further include an absorption portion that is formed on a surface of the structure and absorbs light. In this case, it is possible to reduce reflection of outside light which is not necessary for display of an image and to display an image with high contrast.

Furthermore, in the screen according to the aspect of the invention, it is preferable that the structure have approximately the same shape as a part of a spherical body. In this case, a good viewing angle characteristic can be realized by the structures that can be relatively easily formed.

In addition, according to another aspect of the invention, there is provided a projector that includes the screen described above and displays an image by projecting light onto the screen. A bright and high-quality image can be displayed by providing the screen. As a result, a projector capable of displaying a bright and high-quality image can be obtained.

BRIEF DESCRIPTION OF THE DRAWINGS

The invention will be described with reference to the accompanying drawings, wherein like numbers reference like elements.

DETAILED DESCRIPTION OF EMBODIMENTS

Hereinafter, embodiments of the invention will be described in detail with reference to the accompanying drawings.

First Embodiment

Figure 1:
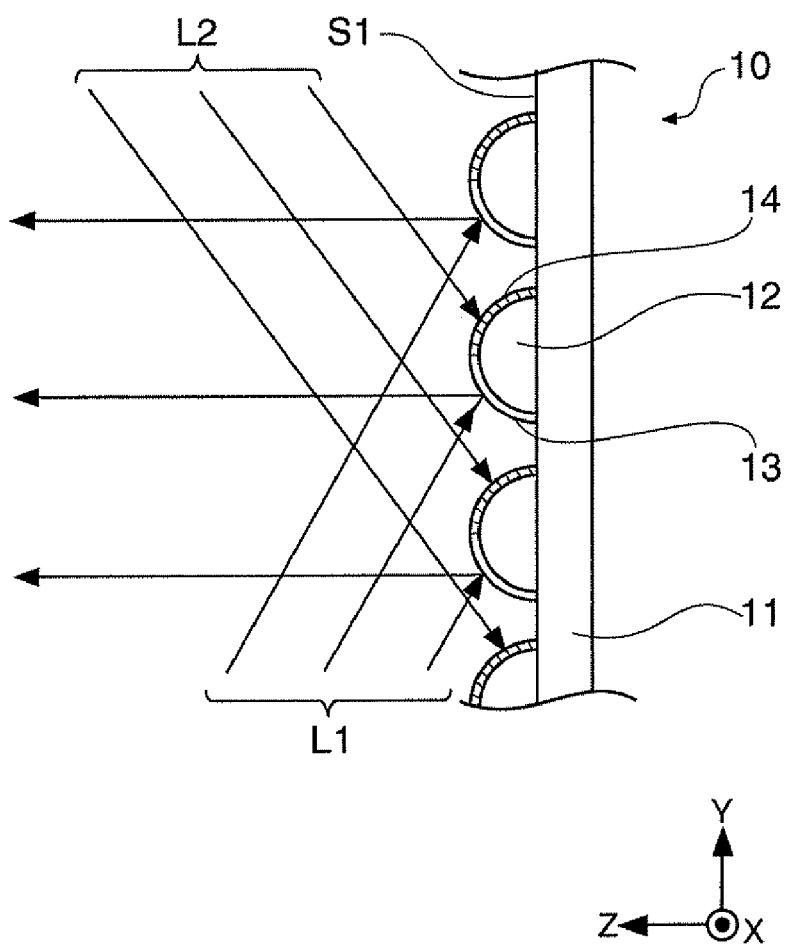
FIG. 1 is a view schematically illustrating the cross-sectional configuration of main parts of a screen according to a first embodiment of the invention.

FIG. 1 is a view schematically illustrating the cross-sectional configuration of main parts of a screen 10 according to a first embodiment of the invention. A substrate 11 is a parallel flat plate having a reference surface S1 which is a flat surface. The reference surface S1 is a surface parallel to an X-axis direction, which is a first direction, and a Y-axis direction, which is a second direction perpendicular to the first direction. The X-axis direction is a horizontal direction, for example. The Y-axis direction is a vertical direction, for example. The X axis is an axis parallel to the reference surface S1. The Y axis is an axis which is perpendicular to the X axis and is parallel to the reference surface S1 on the substrate 11. A Z axis is an axis perpendicular to the X axis and the Y axis. The cross section shown in the drawing is a YZ cross section perpendicular to the reference surface S1.

A plurality of structures 12 are disposed on the reference surface S1. The structure 12 has a protruding shape which is approximately the same as a part of a spherical body obtained by cutting the spherical body along the flat surface. In the cross section shown in the drawing, the structure 12 has an approximately semicircular shape. The structure 12 is formed by using a resin member, for example, an ultraviolet curable resin or foamed ink. The plurality of structures 12 are arrayed in parallel in the two-dimensional direction of the X-axis and Y-axis directions. The plurality of structures 12 are arrayed at distances therebetween.

A reflective portion 13 reflects light. The reflective portion 13 is provided in a portion, on which projection light L1 from an emission position set beforehand for the screen 10 is incident, of a surface of the structure 12. In the structure 12 shown in the drawing, the reflective portion 13 is provided at the vertical lower half of the surface of the structure 12. The reflective portion 13 is formed by applying a highly reflective white coating material or silver coating material on the surface of the structure 12, for example. By forming the reflective portion 13 on the curved surface of the structure 12, the projection light L1 reflected from the reflective portion 13 is diffused toward a viewer side. The high reflectance of the screen 10 can be realized by providing the reflective portion 13. In addition, the good viewing angle characteristic of the screen 10 can be realized by diffusing the projection light L1 toward the viewer side. In addition, the structure 12 may also be formed by using a highly reflective member, for example, a milky (translucent) material. In this case, a portion of the surface of the structure 12 other than a portion where an absorption portion 14 is provided functions as a reflective portion.

The absorption portion 14 absorbs light. The absorption portion 14 is provided in a portion other than the portion, on which the projection light L1 from the emission position set beforehand for the screen 10 is incident, of the surface of the structure 12. In the structure 12 shown in the drawing, the absorption portion 14 is provided at the vertical upper half of the surface of the structure 12. The absorption portion 14 is formed by applying a light-absorbing resin member on the surface of the structure 12, for example. The absorption portion 14 absorbs light incident from a different direction from the projection light L1, for example, outside light L2 which is not necessary for display of an image. The screen 10 can display a high-contrast image thereon by reducing reflection of the outside light L2 using the absorption portion 14. In addition, the structure 12 may also be formed by using a light-absorbing member, for example, a black material. In this case, a portion of the surface of the structure 12 other than a portion where the reflective portion 13 is provided functions as an absorption portion.

Figure 2:
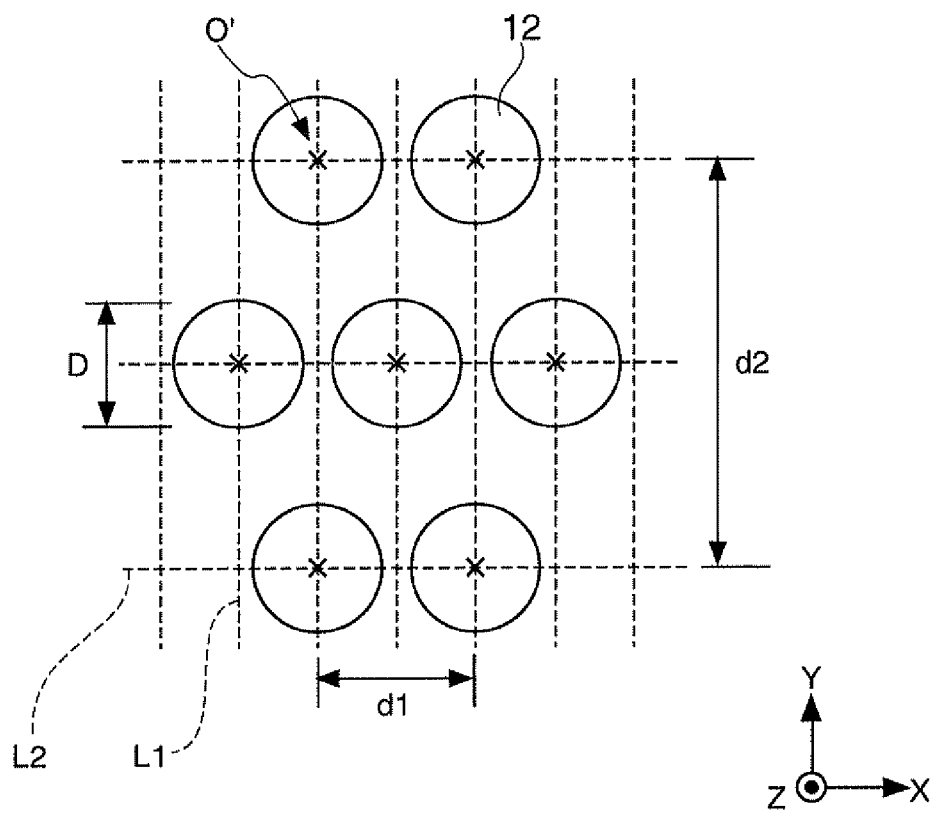
FIG. 2 is a view illustrating the arrangement of structures in a comparative example of the first embodiment.

FIG. 2 is a view explaining the arrangement of the structures 12 in a comparative example of the present embodiment. The comparative example is the same as the present embodiment except that the arrangement of the structures 12 is different from that in the present embodiment. On the XY plane shown in the drawing, each structure 12 has a circular shape with an approximately fixed diameter D. The structures 12 are arrayed continuously in both the X-axis direction and the Y-axis direction. The structures 12 are arrayed to deviate by 1/2 pitch between adjacent columns in both the X-axis direction and the Y-axis direction.

A central position O' is the center of a surface of the structure 12 facing the reference surface S1. A distance d1 between the central positions O' of the structures 12 adjacent to each other in the X direction is approximately constant. In addition, a distance d2 between the central positions O' of the structures 12 adjacent to each other in the Y direction is approximately constant. As the distances d1 and d2 and the diameter D decrease, the fineness of the screen 10 increases but it becomes difficult to manufacture the screen 10. In addition, as the distances d1 and d2 and the diameter D increase, it becomes easy to manufacture the screen 10 but the resolution is reduced. In consideration of difficulties in manufacture or an effect on the resolution, the distance d1 in the X-axis direction and the distance d2 in the Y-axis direction are set to about several tens of micrometers to 1 mm, for example. The diameter D of the structure 12 is set to about several tens of micrometers to 1 mm, for example.

When straight lines L1 arrayed in parallel at distances of d1/2 in the X-axis direction and straight lines L2 arrayed in parallel at distances of d2/2 in the Y-axis direction are assumed, the central position O' is on a point of intersection between the straight line L1 and the straight line L2. Thus, in this comparative example, the structures 12 are arrayed in a regular manner. When the structure 12 is fine and the arrangement of the structures 12 is regular, generation of a moire becomes noticeable. In addition, the moire becomes conspicuous as the reflectance of the screen increases.

Figure 3:
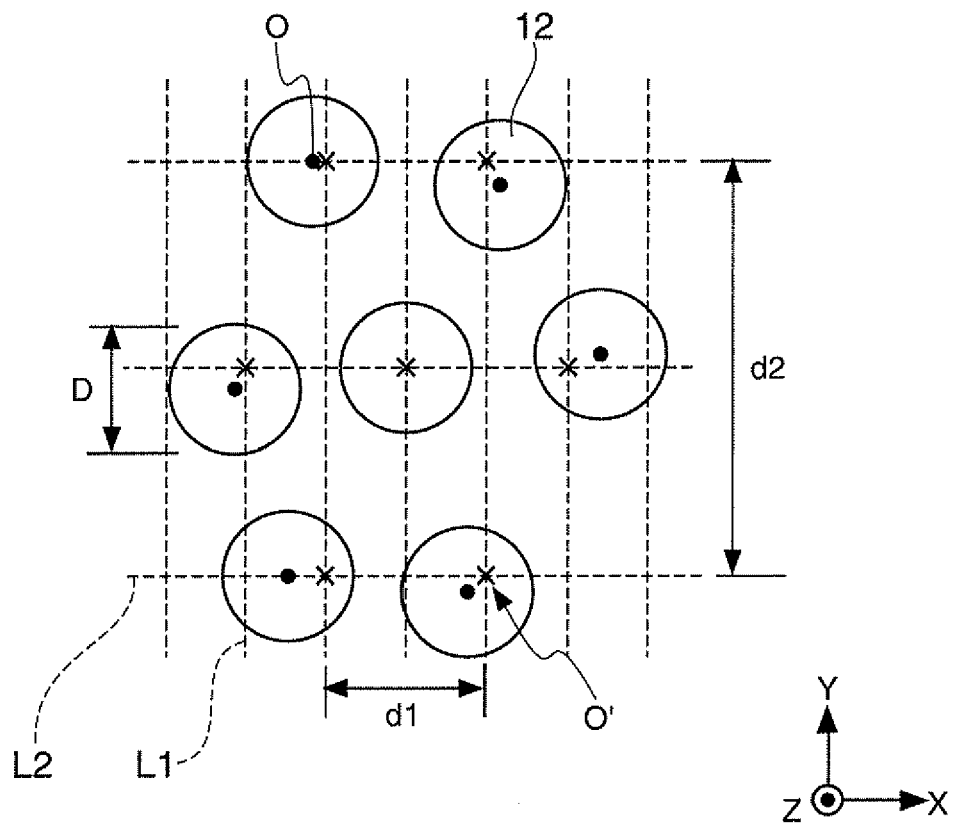
FIG. 3 is a view illustrating the arrangement of structures in the first embodiment.

FIG. 3 is a view explaining the arrangement of the structures 12 in the present embodiment. Compared with the case of the comparative example, the present embodiment is characterized in that a distance between central positions O of the structures 12 adjacent to each other is made to change irregularly. Hereinafter, an explanation will be made assuming that the central position O' of the structure 12 in the case of the comparative example shown in FIG. 2 is a reference position, the distance d1 between the central positions O in the X-axis direction is a reference length in the X-axis direction, and the distance d2 between the central positions O' in the Y-axis direction is a reference length in the Y-axis direction.

Figure 4:
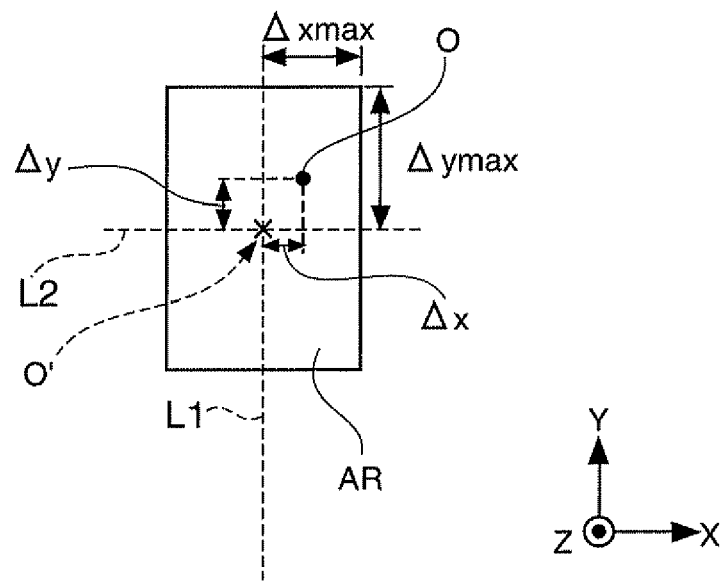
FIG. 4 is a view illustrating the change of the central position to the reference position.

FIG. 4 is a view explaining the change of the central position O to the reference position O'. In both the X-axis direction and the Y-axis direction, it is assumed that directions of arrows indicating axes are plus and directions opposite the arrows are minus. The central position O moves from the reference position O' by a length Δx in the plus X-axis direction or minus X-axis direction and a length Δy in the plus Y-axis direction or minus Y-axis direction. Δx is a distance between the reference position O' and the central position O in the X-axis direction. Δy is a distance between the reference position O' and the central position O in the Y-axis direction. The central position O shown in the drawing moves in the plus X-axis direction and the plus Y-axis direction from the reference position O'.

Lower limits of Δx and Δy are all zero. When Δx is zero, the central position O is on the same straight line L1 as the reference position O'. When Δy is zero, the central position O is on the same straight line L2 as the reference position O'. When Δx and Δy are all zero, the central position O matches the reference position O'. An upper limit Δxmax of Δx is a length equivalent to 5% or more and less than 50% of the reference length d1 in the X-axis direction. For example, the upper limit Δxmax of Δx is a length equivalent to 10% of the reference length d1. An upper limit Δymax of Δy is a length equivalent to 5% or more and less than 50% of the reference length d2 in the Y-axis direction. For example, the upper limit Δymax of Δy is a length equivalent to 10% of the reference length d2. The central position O is a certain position in a rectangular region AR the length of which in the X-axis direction is 2Δxmax, the length of which in the Y-axis direction is 2Δymax, and the center of which is the reference position O'.

By randomly changing Δx and Δy in each structure 12, the central position O may be changed randomly. By randomly setting the central position O of each structure 12, each structure 12 is provided in a condition where the distance between the central positions O of the structures 12 adjacent to each other is irregularly changed in the X-axis and Y-axis directions. Diffraction of light caused by periodicity is reduced by irregularly changing the distance between the central positions O.

It can be seen that an effect of reducing the generation of a moire is obtained by randomly changing the central position O in a condition where Δxmax and Δymax are within a range of 5% or more of the reference lengths d1 and d2. When Δxmax and Δymax are set to lengths equivalent to 50% or more of the reference lengths d1 and d2, the structures 12 adjacent to each other may overlap. When the periodicity is so adversely affected that the structures 12 adjacent to each other overlap, the reflectance or the viewing angle characteristic considered may not be obtained. In order to obtain a high reflectance and a good viewing angle characteristic, it is desirable that Δxmax and Δymax be less than 50% of the reference lengths d1 and d2.

Therefore, by setting Δxmax and Δymax to the lengths equivalent to 5% or more and less than 50% of the reference lengths d1 and d2, it is possible to obtain a bright image and to reduce the generation of a moire. Preferably, by setting Δxmax and Δymax to the lengths equivalent to about 10% to 15% of the reference lengths d1 and d2, it is possible to obtain a brighter image and to effectively reduce the generation of a moire. As described above, effects that a bright image can be obtained by the high reflectance and the good viewing angle characteristic and a high-quality image can be displayed by reducing the generation of a moire are obtained. According to the embodiment of the invention, the moire generated by overlapping of a plurality of periodic patterns (in the present embodiment, a pattern of a pixel caused by the projection light L1 and a pattern of a periodic structure that the screen 10 has) can be reduced. In addition, the screen 10 according to the embodiment of the invention can also reduce the generation of an interference fringe generated by diffraction at the structures 12 provided in the screen 10 regardless of the periodicity of the projection light L1.

The viewing angle characteristic of the screen 10 is determined by suitably setting the reference length d1 in the X-axis direction and the reference length d2 in the Y-axis direction. For example, by setting d1<d2, it becomes possible to view a bright image in a wide range in the horizontal direction compared with the vertical direction. In addition, the reference lengths d1 and d2 do not necessarily need to be fixed lengths on the entire screen 10. The reference lengths d1 and d2 may also be set to change according to the distance from the emission position set beforehand for the screen 10. In this case, the reference lengths d1 and d2 are approximately fixed lengths partially but are different lengths in portions spaced apart from each other on the screen 10.

The structure 12 is formed, for example, by transferring a shape formed in a mold to a material member. The mold used for the transfer is formed by using a photolithographic technique, for example. A mold with a desired shape is formed by performing etching processing after patterning the resist applied on the substrate. The structure 12 with approximately the same shape as a part of a spherical body can be relatively easily formed by using such a method. In addition, by suitably controlling the resist removal position when forming the mold, the positions of the structures 12 can be easily adjusted such that the distance between the central positions O changes irregularly. In addition, the structures 12 may also be formed by using any kind of method used in the related art.

Figure 5:
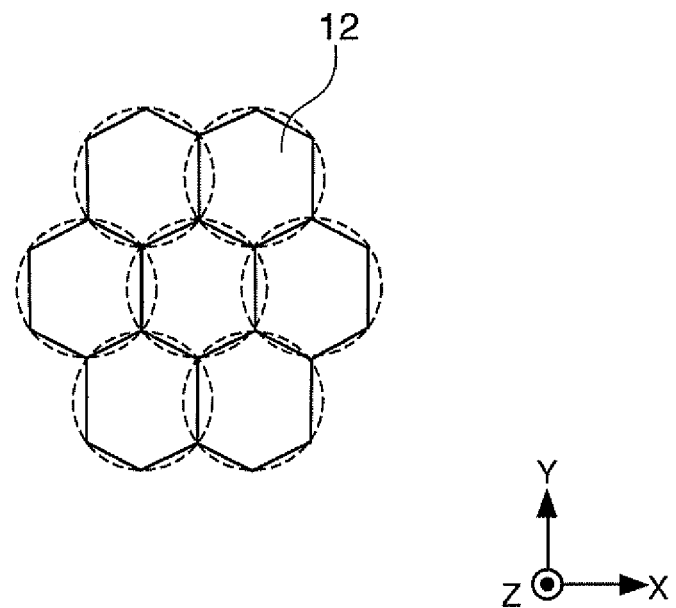
FIG. 5 is a view illustrating an example of a case in which structures are arrayed without gaps therebetween.

The structures 12 do not necessarily need to be arrayed at distances therebetween. For example, as shown in FIG. 5, the structures 12 may be arrayed without gaps therebetween. By arraying the structures 12 without gaps therebetween, each of the structures 12 has a hexagonal shape on the XY plane. For example, when the structures 12 with the diameter D of 200 μm are arrayed without gaps therebetween, the reference length d1 in the X-axis direction and the reference length d2 in the Y-axis direction are set to 100 μm and 200 μm, respectively. Also in this case, the effect of reducing the generation of a moire can be obtained by irregularly changing the distance between the central positions of the structures 12.

The structures 12 may be arrayed to deviate by a pitch other than 1/2 pitch between adjacent columns in the X-axis and Y-axis directions or may be arrayed in a matrix such that the structures 12 do not deviate between the adjacent columns. The structure 12 does not necessarily need to have approximately the same shape as a part of the spherical body. The structure 12 may also have a shape with an aspheric surface, an adjustable surface, or a flat surface instead of a spherical surface. For example, the structure 12 may have approximately the same shape as a part of an ellipsoidal surface, a conical shape, or a pyramid shape. In addition, the structure 12 does not necessarily need to have a protruding shape and may have a recessed shape.

Figure 6:
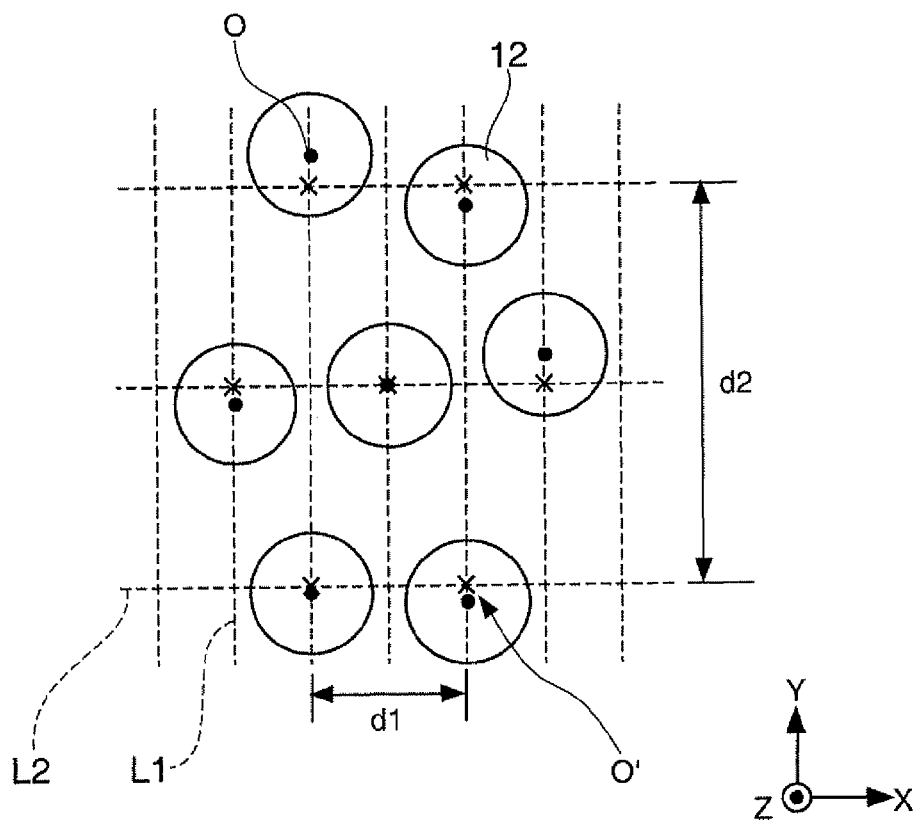
FIG. 6 is a view illustrating the arrangement of structures in a first modification of the first embodiment.

FIG. 6 is a view explaining the arrangement of the structures 12 in a first modification of the present embodiment. This modification is characterized in that the distance between the central positions O is made to change irregularly only in the Y-axis direction of the X-axis and Y-axis directions. The central positions O are all on the straight line L1. The structures 12 are arrayed such that the distance between the central positions O of the structures 12 adjacent to each other in the X-axis direction is the reference length d1 (Δx=0). For the Y-axis direction, the central position O of each structure 12 is randomly set in the same manner as described using FIG. 4. An upper limit Δymax of Δy is a length equivalent to 5% or more and less than 50% of the reference length d2 in the Y-axis direction. For example, the upper limit Δymax of Δy is assumed to be a length equivalent to 10% of the reference length d2.

Thus, the effect of reducing the generation of a moire can be obtained by irregularly changing the distance between the central positions O at least in one direction. In addition, the distance between the central positions O of the structures 12 may also be made to change irregularly only in the X-axis direction of the X-axis and Y-axis directions. In this case, the structures 12 are arrayed such that the distance between the central positions O of the structures 12 adjacent to each other in the Y-axis direction is the reference length d2 (Δy=0). An upper limit Δxmax of Δx is a length equivalent to 5% or more and less than 50% of the reference length d1 in the X-axis direction. For example, the upper limit Δxmax of Δx is a length equivalent to 10% of the reference length d1.

Figure 7:
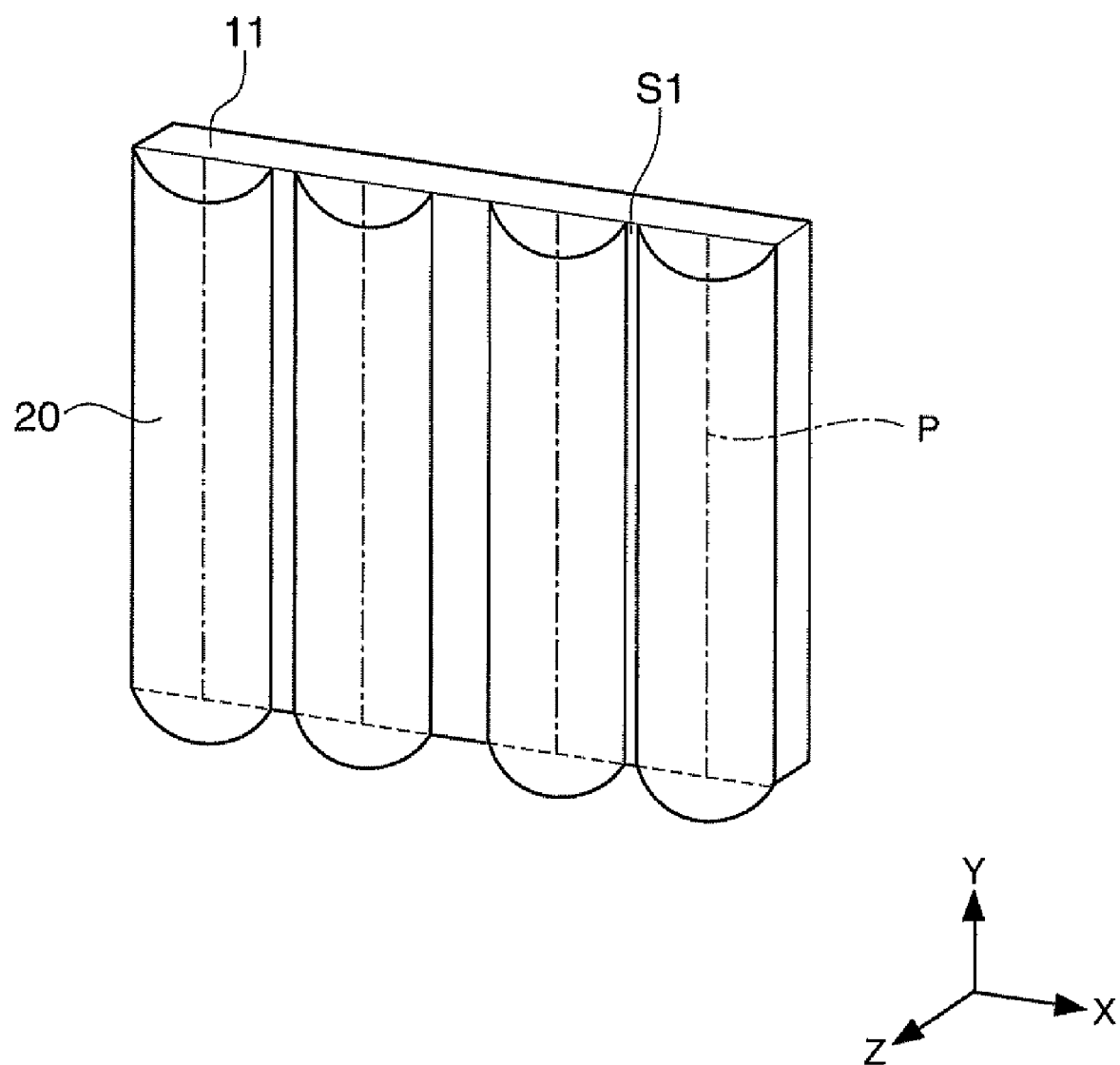
FIG. 7 is a view illustrating the arrangement of structures in a second modification of the first embodiment.

FIG. 7 is a view explaining the arrangement of structures 20 in a second modification of the present embodiment. In this modification, the structures 20 are arrayed in parallel only in the X-axis direction of the X-axis and Y-axis directions. Each structure 20 has a shape which is longer in the Y-axis direction than the X-axis direction. Each structure 20 has a protruding shape which is approximately the same as a shape obtained by cutting a cylinder along a plane perpendicular to bottom and top surfaces of the cylinder.

A centerline P is a straight line that equally divides a rectangular shape of the structure 20, which is in contact with the reference surface S1, in the X-axis direction and is approximately parallel to the Y axis. The centerline P is a central position of the structure 20 in the X-axis direction. The structures 20 are arrayed such that a distance between the centerlines P adjacent to each other in the X-axis direction changes irregularly. Also in this modification, an upper limit of the length from the reference position to the centerline P is a length equivalent to 5% or more and less than 50% of the reference length in the X-axis direction. For example, the upper limit of the length from the reference position to the centerline P is a length equivalent to 10% of the reference length. By irregularly changing the distance between the centerlines P of the structures 20 in the X-axis direction in which the structures 20 are arrayed in parallel, the effect of reducing the generation of a moire can be obtained. Alternatively, in this modification, structures which are longer in the X-axis direction than the Y-axis direction may be arrayed in parallel in the Y-axis direction. Also in this case, the effect of reducing the generation of a moire can be obtained by irregularly changing the distance between the centerlines P in the Y-axis direction in which the structures are arrayed in parallel.

Second Embodiment

Figure 8:
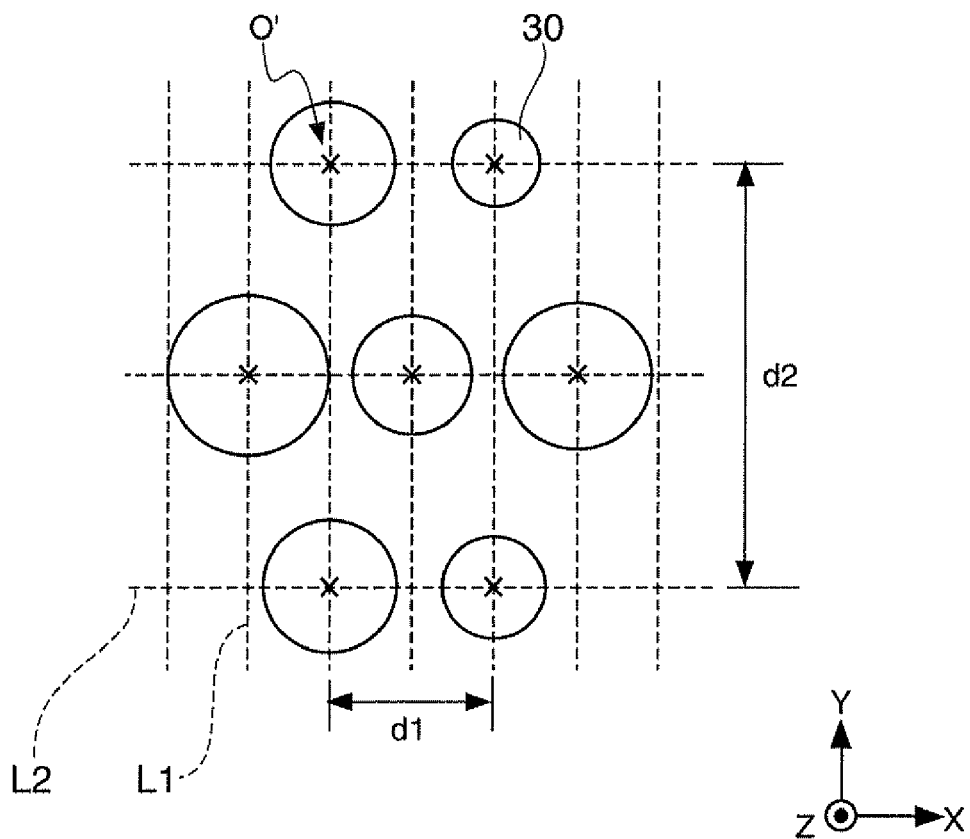
FIG. 8 is a view illustrating the arrangement of structures in a second embodiment of the embodiment.

FIG. 8 is a view explaining the arrangement of structures 30 in a second embodiment of the invention. The structure 30 described in the present embodiment is applied to the screen 10 according to the first embodiment. The present embodiment is characterized in that the structures 30 whose sizes change irregularly are arrayed in parallel in the X-axis and Y-axis directions. The same components as in the first embodiment are denoted by the same reference numerals, and a repeated explanation thereof will be omitted.

The structures 30 have shapes which are approximately the same as a part of a spherical body and have similar shapes. The size of each structure 30 is changed by changing a magnification of a shape used as a reference. A distance d1 between the central positions O' of the structures 30 adjacent to each other in the X direction is approximately constant. In addition, a distance d2 between the central positions O' of the structures 30 adjacent to each other in the Y direction is approximately constant. The central position O' is on a point of intersection between the straight line L1 and the straight line L2.

Hereinafter, an explanation will be made by setting the diameter D of the structure 12 in the comparative example shown in FIG. 2 as a reference width of the structure 30 in the X-axis and Y-axis directions thereof in the present embodiment. A lower limit of the diameter of each structure 30 is a length larger than 50% of the reference width D and equal to or smaller than 95% of the reference width D. For example, the lower limit of the diameter of each structure 30 is a length equivalent to 90% of the reference width D. An upper limit of the diameter of each structure 30 is a length equivalent to 105% or more and less than 150% of the reference width D. For example, the upper limit of the diameter of each structure 30 is a length equivalent to 110% of the reference width D. Thus, the upper and lower limits of the diameter of each structure 30 are assumed to be lengths changed from the reference width D by a length equivalent to 5% or more and less than 50% of the reference width D.

The width of each structure 30 in the X-axis direction and the width of each structure 30 in the Y-axis direction are changed by changing the diameter of each structure 30. By randomly setting the diameter of each structure 30, the structures 30 are provided such that the size of each structure 30 changes irregularly. Generation of a moire can be reduced by randomly changing the diameter in a condition where the lengths changed by 5% or more from the reference width D are set as the upper and lower limits. When the lengths changed by 50% or more from the reference width D are set as the upper and lower limits, the reflectance or the viewing angle characteristic considered may not be obtained because the structures 30 adjacent to each other may overlap each other. In order to obtain a high reflectance and a good viewing angle characteristic, it is desirable to set, as the upper and lower limits, the lengths changed less than 50% from the reference value D. Thus, by setting the upper and lower limits of the diameter of each structure 30 to the lengths changed from the reference width D by a length equivalent to 5% or more and less than 50% of the reference width D, it is possible to obtain a bright image and to reduce the generation of a moire. As described above, also in the present embodiment, a bright image can be obtained by the high reflectance and the good viewing angle characteristic, and a high-quality image can be displayed by reducing generation of a moire and generation of an interference fringe.

Similar to the case of the first embodiment described above, the structure 30 in the present embodiment is also formed by formation of a mold using the photolithographic technique and transfer of the shape formed in the mold to a material member. By suitably controlling the resist removal range when forming the mold, the shape of the structure 30 can be easily adjusted such that the size of the structures 30 changes irregularly. In addition, the structures 30 may also be formed by using any kind of method used in the related art.

The present embodiment is not limited to the case in which the structures 30 whose sizes change irregularly are arrayed in parallel in both the X-axis direction and the Y-axis direction. If the screen 10 has a configuration in which the structures 30 whose sizes change irregularly are arrayed in parallel in at least one direction of the X-axis and Y-axis directions, the effect of reducing the generation of a moire can be obtained. For example, the structures 30 with approximately the same size may be arrayed in parallel in one direction of the X-axis and Y-axis directions.

Figure 9:
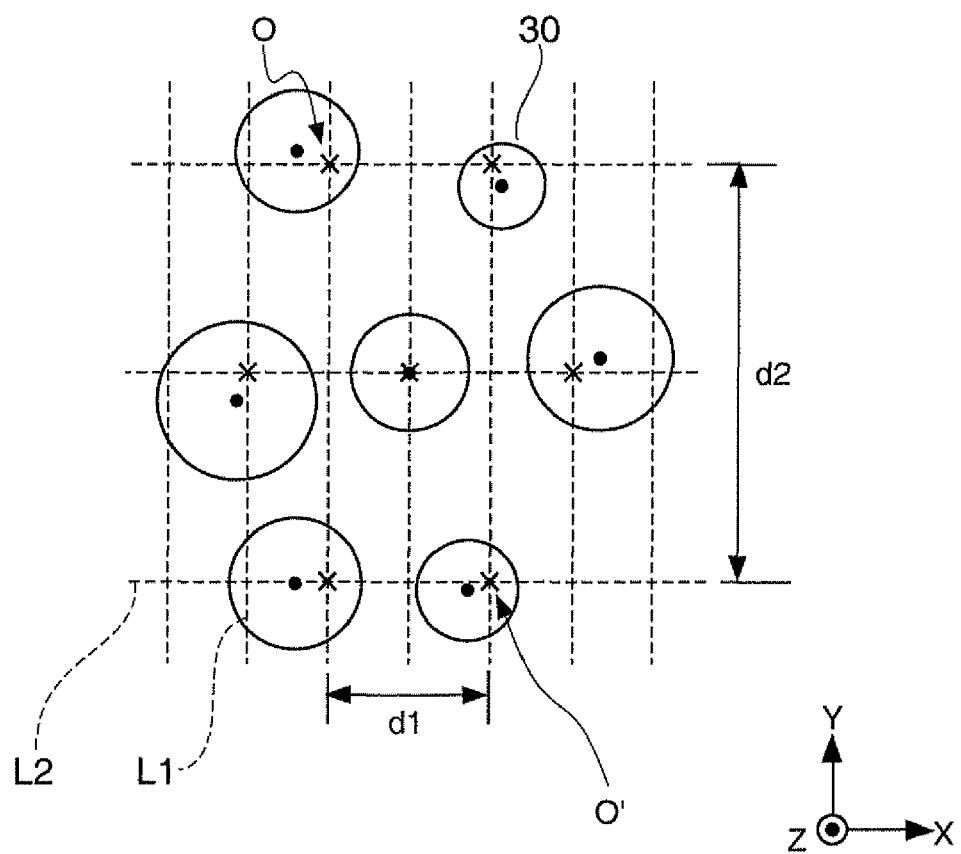
FIG. 9 is a view illustrating the arrangement of structures in a modification of the second embodiment.

FIG. 9 is a view explaining the arrangement of the structures 30 in a modification of the present embodiment. This modification is characterized in that the structures 30 whose sizes change irregularly are arrayed in parallel in the X-axis and Y-axis directions and the distance between the central positions O changes irregularly in the X-axis and Y-axis directions. The arrangement of the central positions O of the structures 30 are similar to the case of the first embodiment described using FIGS. 3 and 4. By providing the structures 30 such that the size of the structure 30 and the distance between the central positions O of the structures 30 change irregularly, diffraction of light caused by the periodicity can be further reduced compared with a case where either the size or the distance changes irregularly. As a result, the generation of a moire can be reduced more effectively.

In the present embodiment, only one of the width of the structure 30 in the X-axis direction and the width of the structure 30 in the Y-axis direction may be changed in addition to the case in which both the width in the X-axis direction and the width in the Y-axis direction are changed. If the screen 10 has a configuration in which the size of the structure 30 is irregularly changed by changing only one of the width in the X-axis direction and the width in the Y-axis direction, the effect of reducing the generation of a moire can be obtained. For example, in the case of a configuration having the structures 20 (refer to FIG. 7) which are long in the Y-axis direction, the width of the structure 20 may be changed in the X-axis direction in which the structures 20 are arrayed in parallel.

Third Embodiment

Figure 10:
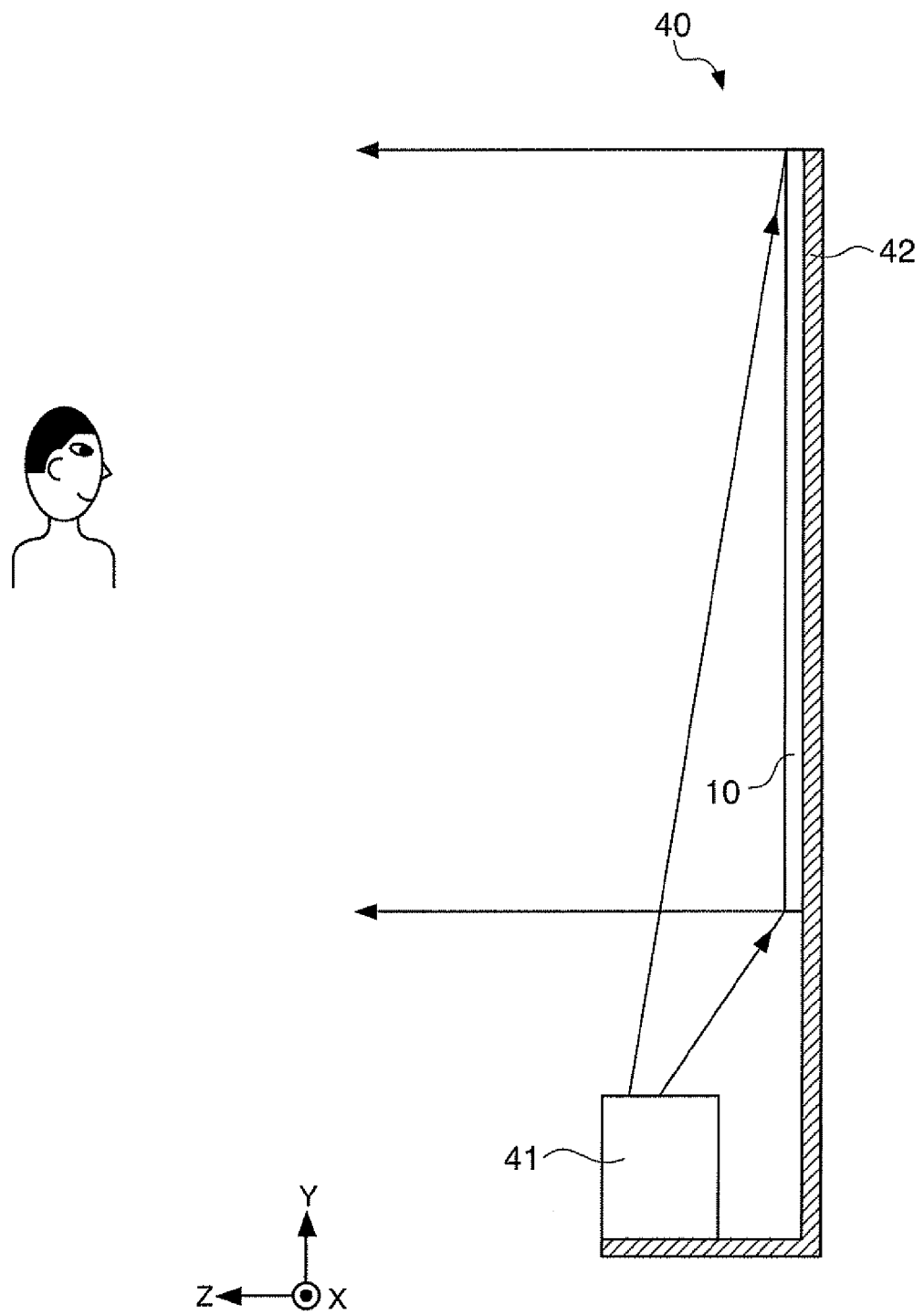
FIG. 10 is a view schematically illustrating the configuration of a projector according to a third embodiment of the invention.

FIG. 10 is a view schematically illustrating the configuration of a projector 40 according to a third embodiment of the invention. The projector 40 has a projection engine portion 41 and the screen 10 according to the above-described embodiment. A support portion 42 supports the projection engine portion 41 and the screen 10. The projection engine portion 41 performs close projection from the position of 1 m or less from a surface of the support portion 42 on which the screen 10 is disposed, for example, from the position of about 30 cm. Light incident on the screen 10 from the projection engine portion 41 is largely inclined with respect to the normal of the reference surface S1 (refer to FIG. 1). In addition, the projector 40 may have a configuration in which the projection engine portion 41 directly supports the screen 10, for example, without being limited to the case in which the support portion 42 is provided.

Figure 11:
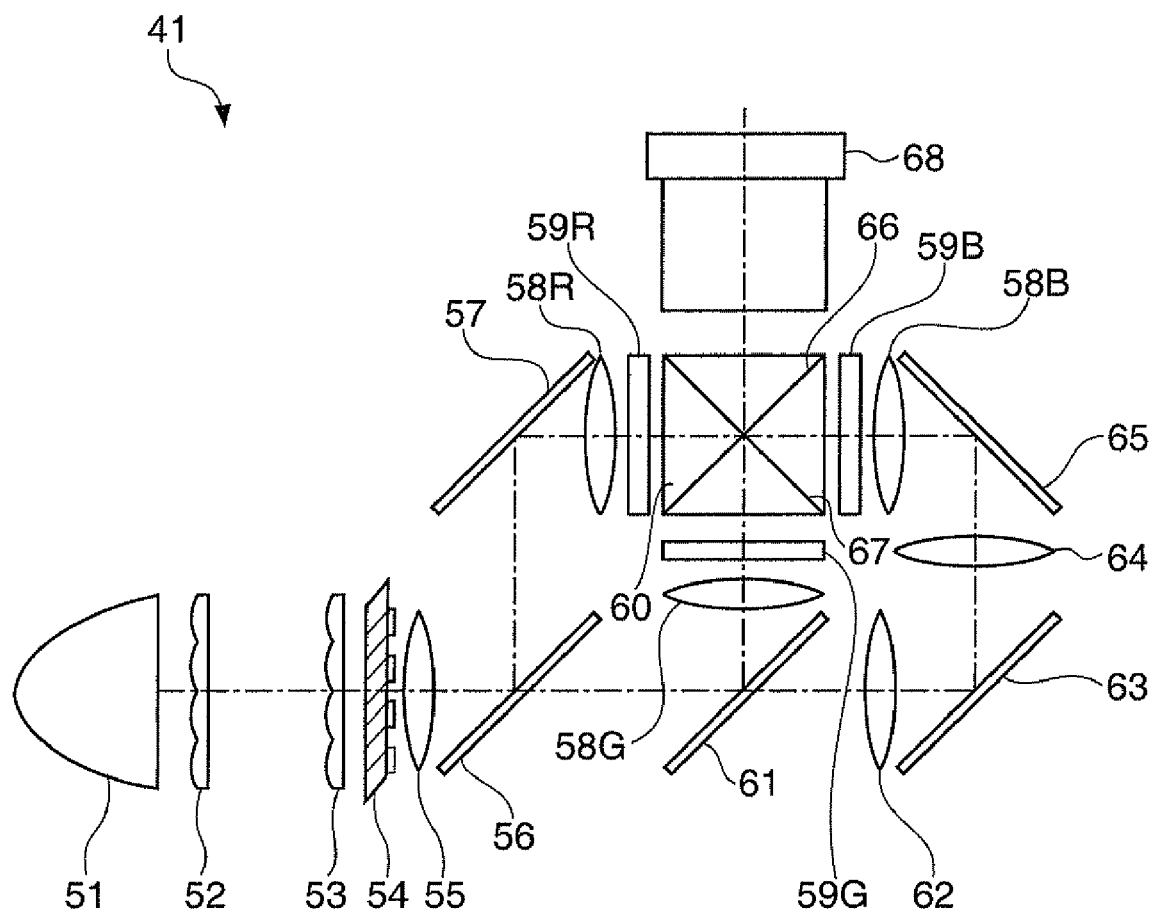
FIG. 11 is a view schematically illustrating the configuration of a projection engine portion.

FIG. 11 is a view schematically illustrating the configuration of the projection engine portion 41. An ultra high pressure mercury lamp 51 is a light source unit that emits light components including red (R) light, green (G) light, and blue (B) light. A first integrator lens 52 and a second integrator lens 53 each have a plurality of lens elements arrayed in the shape of an array. The first integrator lens 52 divides light from the ultra high pressure mercury lamp 51 into a plurality of light beams. Each lens element of the first integrator lens 52 makes the light beams from the ultra high pressure mercury lamp 51 condensed near the lens element of the second integrator lens 53. The lens element of the second integrator lens 53 forms an image of the lens element of the first integrator lens 52 on a spatial light modulation device.

The light beams transmitted through the two integrator lenses 52 and 53 are converted into linearly polarized light beams in the specific oscillating direction by a polarization conversion element 54. A superposition lens 55 makes an image of each lens element of the first integrator lens 52 superimposed on the spatial light modulation device. The first integrator lens 52, the second integrator lens 53, and the superposition lens 55 make the intensity distribution of light from the ultra high pressure mercury lamp 51 uniform on the spatial light modulation device. The light from the superposition lens 55 is incident on a first dichroic mirror 56. The first dichroic mirror 56 makes R light reflected therefrom and G light and B light transmitted therethrough. The R light reflected by the first dichroic mirror 56 is incident on a field lens 58R for R light after an optical path of the R light is bent at the first dichroic mirror 56 and a reflecting mirror 57. The field lens 58R for R light makes R light beams from the reflecting mirror 57 parallelized and the parallelized R beams incident on a spatial light modulation device 59R for R light.

The spatial light modulation device 59R for R light is a spatial light modulation device that modulates R light according to an image signal, and is a transmissive liquid crystal display device. A liquid crystal panel (not shown) provided in the spatial light modulation device 59R for R light has a liquid crystal layer interposed between two transparent substrates in order to modulate light according to an image signal. The R light modulated by the spatial light modulation device 59R for R light is incident on a cross dichroic prism 60 that is a color mixing optical system.

The G light and the B light transmitted through the first dichroic mirror 56 are incident on a second dichroic mirror 61. The second dichroic mirror 61 makes the G light reflected therefrom and the B light transmitted therethrough. The G light reflected by the second dichroic mirror 61 is incident on a field lens 58G for G light after an optical path of the G light is bent at the second dichroic mirror 61. The field lens 58G for G light makes the G light beams from the second dichroic mirror 61 parallelized and the parallelized G beams incident on a spatial light modulation device 59G for G light. The spatial light modulation device 59G for G light is a spatial light modulation device that modulates G light according to an image signal, and is a transmissive liquid crystal display device. The G light modulated by the spatial light modulation device 59G for G light is incident on a surface of the cross dichroic prism 60 different from the surface on which the R light is incident.

The B light transmitted through the second dichroic mirror 61 is transmitted through a relay lens 62, and then the optical path is bent by reflection at a reflecting mirror 63. The B light reflected from the reflecting mirror 63 is further transmitted through a relay lens 64. Then, the B light is incident on a field lens 58B for B light after the optical path is bent by reflection at a reflecting mirror 65. Since the optical path of B light is longer than the optical path of R light and the optical path of G light, a relay optical system that uses the relay lenses 62 and 64 is adopted in the optical path of B light in order to make an illumination rate in the spatial light modulation device for B light equal to those for light components with the other colors.

The field lens 58B for B light makes B light beams from the reflecting mirror 65 parallelized and the parallelized B beams incident on a spatial light modulation device 59B for B light. The spatial light modulation device 59B for B light is a spatial light modulation device that modulates B light according to an image signal, and is a transmissive liquid crystal display device. The B light modulated by the spatial light modulation device 59B for B light is incident on a surface of the cross dichroic prism 60 different from the surface on which the R light is incident and the surface on which the G light is incident.

The cross dichroic prism 60 has two dichroic films 66 and 67 disposed to be approximately perpendicular to each other. The first dichroic film 66 makes the R light reflected therefrom and the G light and the B light transmitted therethrough. The second dichroic film 67 makes the B light reflected therefrom and the R light and the G light transmitted therethrough. The cross dichroic prism 60 mixes the R light, the G light, and the B light incident from different directions and then emits the mixed light in the direction of a projection lens 68. The projection lens 68 projects the light mixed by the cross dichroic prism 60 toward the direction of the screen 10. An optical element for performing close projection with the light from the projection lens 68, for example, a mirror with an aspheric shape may be used for the projection engine portion 41.

The projection engine portion 41 is not limited to having a configuration in which the ultra high pressure mercury lamp 51 is used as a light source unit. It may also be possible to adopt a configuration in which a lamp other than the ultra high pressure mercury lamp 51, a light-emitting diode (LED), a laser light source, or the like is used as the light source unit. The projection engine portion 41 is not limited to having a configuration in which the spatial light modulation device is provided for every color light component, and may be configured to modulate two or three or more color light components using one spatial light modulation device.

By using the screen 10 according to the first embodiment, the projector 40 can display a bright image with a high reflectance and a good viewing angle characteristic and can reduce the generation of a moire and the generation of an interference fringe. Accordingly, an effect that a bright and high-quality image can be displayed is obtained. The screen 10 according to the embodiment of the invention does not necessarily need to be used in a state of being united with the projection engine portion 41 in order to form the projector 40, and may also be used in combination with a projector disposed at the position distant from the screen 10. The screen 10 does not necessarily need to be configured such that projection light largely inclined with respect to the normal of the reference surface S1 is incident on the screen 10. For example, the screen 10 may be configured such that projection light slightly inclined with respect to the normal of the reference surface S1 is incident on the screen 10. In addition, the configuration of the screen 10 according to the embodiment of the invention may also be applied to a transmissive screen that allows light corresponding to an image signal to be transmitted therethrough. The projector 40 may also be a so-called rear projector that supplies light onto one surface of a transmissive screen so that an image can be viewed by observing the light emitted from the other surface of the screen.

What is claimed is:

1. A screen comprising:
a plurality of structures arrayed in parallel in at least one direction of a first direction, and in a second direction perpendicular to the first direction, on a reference surface parallel to the first direction and the second direction,
the structures being arrayed such that at least one of a distance between central positions of the structures adjacent to each other and a size of the structure changes irregularly in at least one direction, in which the structures are arrayed in parallel, of the first and second directions, and
the structures being arrayed such that an upper limit of a distance between a predetermined reference position and the central position is 5% to less than 50% of a predetermined reference length in at least one direction of the first and second directions.

2. The screen of claim 1,
the structures being arrayed such that at least one of the distance between the central positions and the size changes irregularly in the first and second directions.

3. The screen of claim 1,
upper and lower limits of a width of each of the structures in at least one direction of the first and second directions being changeable from a predetermined reference width by a length equivalent to 5% to less than 50% of the predetermined reference width.

4. The screen of claim 1, further comprising:
a reflective portion that is formed on a surface of the structure and reflects light.

5. The screen of claim 1, further comprising:
an absorption portion that is formed on a surface of the structure and absorbs light.

6. The screen of claim 1,
the structure having approximately the same shape as a part of a spherical body or a cylindrical body.

7. A projector comprising:
the screen according to claim 1, and
a light source, an image being displayed by projecting light onto the screen.

8. A screen comprising:
a substrate; and
an array of convex or concave portions disposed on the substrate, the convex or concave portions having various sizes, or being disposed at various distances from each other,
each of the plurality of convex or concave portions having a center, a distance between each of the convex or concave portions in a first direction being irregular,
a distance between each of the convex or concave portions in a second direction being irregular, and
the distance between adjacent convex or concave portions in the first direction and in the second direction being set at a first predetermined distance and at a second predetermined distance, the adjacent convex or concave portions in the first direction being randomly changeable from 5% to less than 50% of the predetermined distance in the first direction, and the distance between adjacent convex or concave portions in the second direction being randomly changeable from 5% to less than 50% of the predetermined distance in the second direction.

9. The screen of claim 8, each of the convex or concave portions having a reflective surface and an absorption surface.

10. The screen of claim 8, the array of convex or concave portions forming columns and rows, the convex or concave portions being arrayed to deviate by a predetermined pitch between adjacent columns, and between adjacent rows.

11. The screen of claim 8, each of the plurality of convex or concave portions having a predetermined diameter randomly changeable from 5% to less than 50% of the predetermined diameter.

12. A projector comprising:
the screen of claim 8, and
a light source, an image being displayed by projecting light onto the screen.

* * * * *